US009297704B2

(12) United States Patent
Corcos et al.

(10) Patent No.: US 9,297,704 B2
(45) Date of Patent: Mar. 29, 2016

(54) MODULATION METHODS FOR CMOS-BASED THERMAL SENSORS

(71) Applicant: International Business Machines Corporation, Armonk, NY (US)

(72) Inventors: Dan Corcos, Nesher (IL); Michel Despont, Au (SZ); Danny Elad, Moshav Liman (IL); Thomas Morf, Gross (SZ); Mehmet Soyuer, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 14/158,878

(22) Filed: Jan. 20, 2014

(65) Prior Publication Data
US 2015/0204731 A1    Jul. 23, 2015

(51) Int. Cl.
G01K 7/00    (2006.01)
G01K 7/01    (2006.01)

(52) U.S. Cl.
CPC ...................... *G01K 7/015* (2013.01)

(58) Field of Classification Search
CPC .................... G01K 7/00; G01K 7/01
USPC ........................................... 374/178
See application file for complete search history.

(56) References Cited

U.S. PATENT DOCUMENTS

| 6,548,840 B1 * | 4/2003 | Pobanz | H01L 29/8605 257/252 |
| 7,012,468 B2 * | 3/2006 | Brederlow | H03F 1/26 330/10 |
| 2002/0050861 A1 * | 5/2002 | Nguyen | H03F 1/3211 330/254 |
| 2009/0141846 A1 * | 6/2009 | Hibi | H03K 1/15033 375/376 |
| 2010/0140455 A1 * | 6/2010 | Nathan | G01D 5/24 250/214 A |

FOREIGN PATENT DOCUMENTS

WO    2010076783    7/2010

OTHER PUBLICATIONS

Lu et al., "CMOS micromachined structures using transistors in the subthreshold region for thermal sensing", Journal of Micro mechanics and Micro engineering, vol. 16, pp. 1734-1739, 2006.
Mohammadi et al., "Frequency Modulation Technique for MEMS Resistive Sensing" Sensors Journal, IEEE, vol. 12, No. 8, pp. 2690-2698, Aug. 2012.
IBM, "Method / Circuit to Eliminate 1/f-noise and Low-frequency Interference Signals from Thermal Position Sensor Signal", IP.com, Aug. 2007.

* cited by examiner

*Primary Examiner* — Lisa Caputo
*Assistant Examiner* — Jamel Williams
(74) *Attorney, Agent, or Firm* — Ziv Glazberg

(57) ABSTRACT

A method and circuit for determining a working temperature of a device, the method comprising: providing a first signal to a device having a temperature-sensitive characteristic; performing a function on the first signal by the device; demodulating a second signal output by the device to obtain a third signal thus generating a signal having reduced 1/f noise component; and based upon the first signal and the second signal, determining a working temperature of the device.

10 Claims, 8 Drawing Sheets

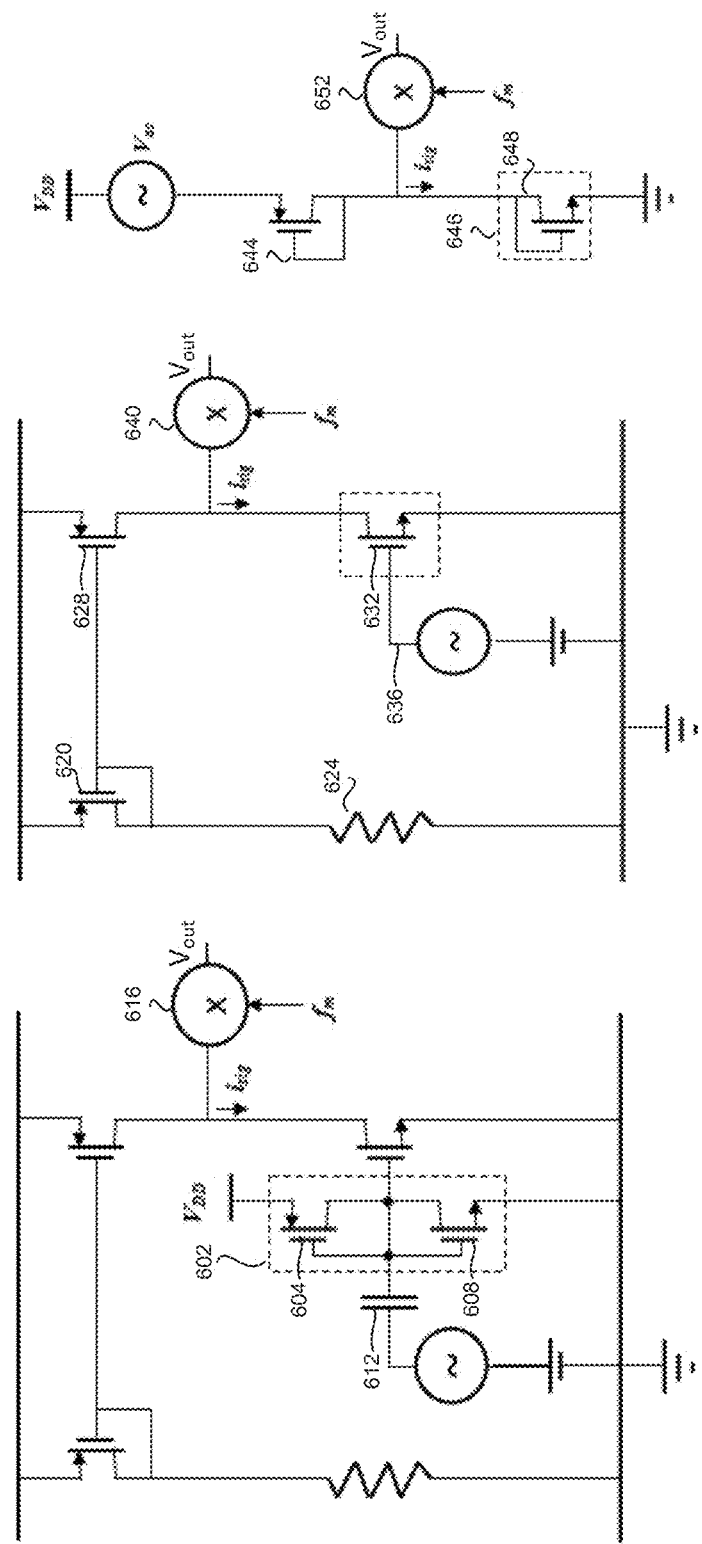

MODULATION METHODS FOR CMOS-BASED THERMAL SENSORS

TECHNICAL FIELD

The present disclosure relates to temperature sensing devices, and more specifically but not exclusively to temperature sensing devices manufactured in a standard CMOS in particular.

BACKGROUND

Thermal sensors have a wide variety of uses. In some applications such as health or weather applications, a simple mercury thermometer is sufficient, while other cases require the measurement of the temperature or temperature changes with much finer resolutions. For example, imaging applications and in particular radiation sensors (pixels) for imaging in the infrared and sub-millimeter range are particularly demanding in terms of sensitivity, e.g. fractions of degrees. Other applications include but are not limited to temperature monitoring in digital processors and transduction of other physical effects, and in particular Terahertz (THz) imaging.

Some known thermal sensors include thermopiles, diodes, high Temperature Coefficient resistors (TCR), pyro-electric detectors and thermo-mechanical capacitors.

Some applications use thermal devices manufactured in standard CMOS technology. The sensitivity of such sensors is generally limited by the ratio of their output referred noise and their electrical responsivity. The lower this ratio, the higher is the temperature resolution or the accuracy of the sensor. In some implementations, improving the resolution include boosting the responsivity, such as in resistive bolometers operated with very large pulses of current, which amplify the signal. In other implementations, despite very low responsivity in comparison to other devices, a device may also have very low electrical noise, typically due to the lack of bias current flowing during operation, thus providing for high resolution.

A MOSFET-based thermal sensor has high temperature responsivity, similar to that of non-CMOS compatible materials, and it can be operated with significantly lower currents. Low currents allow for continuous operation rather than pulsed operation, low noise bandwidth and prevention of self-heating. CMOS detectors may be integrated in any standard silicon integrated circuit (IC).

Known detectors using MOSFET-based thermal sensors achieve sufficient performance for applications if the signal to be measured is large in comparison to the fundamental noises that are generated in the detector. One such case is IR detectors, since room temperature objects emit relatively high power in the relevant wavelength range.

Some applications of particular interest include the subject of Terahertz (THz) imaging, which is a significant nondestructive evaluation technique, which may be used for dielectric materials analysis and quality control in the pharmaceutical, biomedical, security, materials characterization, and aerospace industries. The use of THz waves for non-destructive evaluation enables inspection of multi-layered structures and can identify abnormalities from foreign material inclusions, disbond and delamination, mechanical impact damage, heat damage, and water or hydraulic fluid ingression.

Such applications, however, may have higher requirements in terms of temperature resolution. For example, using Planck's law and geometrical optics it can be shown that a pixel of a passive Terahertz camera must be able to detect a temperature change which is significantly smaller than the lowest temperature change that is theoretically achievable using the mentioned solutions.

A limitation of MOSFET-based detectors lies in the significant 1/f noise, caused by defects of the silicon and oxide interface. This noise and also the sensor's responsivity, are substantially proportional to the bias current, therefore it is impossible to overcome this limitation by driving a large-pulsed current. 1/f noise could be reduced by increasing the width and/or length of the sensing MOSFET. However a larger MOSFET will create a larger thermal mass and an undesirably slower response. When applied to electro-optical devices, CMOS thermal sensing may benefit from the modulation of the optical signal with a chopper wheel, and the subsequent demodulation of the electrical signal after the transduction process. Optical modulation applied to thermal sensors, however, is not much effective due to the slow thermal time constants that are typically associated with those sensors. The slower the sensor is, the lower is the modulation frequency that can be successfully applied with a chopper. In practice, optical modulation is inefficient whenever the knee frequency of the noise spectrum is above a few kilohertz, which is the typical case for MOSFETs used as temperature sensors.

Thus, existing technologies cannot provide sufficient resolution to high-requirement applications, such as THz imaging.

BRIEF SUMMARY

One aspect of the disclosure relates to a method for determining a working temperature of a device, comprising: providing a first signal to a device having a temperature-sensitive characteristic; performing a function on the first signal by the device; demodulating a second signal output by the device to obtain a third signal thus generating a signal having reduced 1/f noise component; and based upon the first signal and the second signal, determining a working temperature of the device.

Another aspect of the disclosure relates to a circuit determining a working temperature of a device, comprising: a device having temperature-sensitive characteristic, the device performing a function on an input signal and outputting an output signal; a signal source for providing the input signal to the device; and a demodulator for demodulating the output signal, thus generating a signal having reduced 1/f noise component.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 6A-6C show three embodiments of circuits for measuring temperature changes, in accordance with some exemplary embodiments of the disclosed subject matter.

DETAILED DESCRIPTION

Figure 1A:
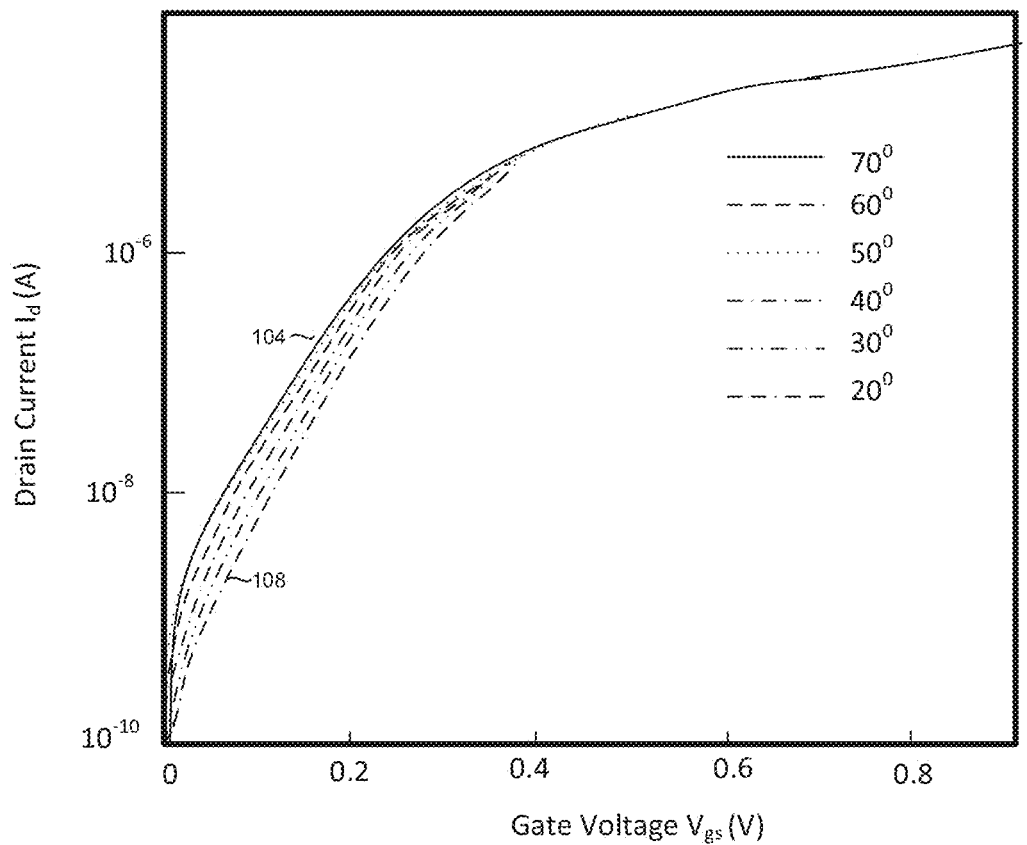
FIG. 1A shows a graph of a sensor's current-voltage characteristic at different temperatures.

One technical problem dealt with by the disclosed subject matter relates to measuring temperature or temperature changes by devices manufactured in standard CMOS process. Such devices may be required in applications such as imaging sensors in the infrared sub-millimeter range, and in particular Terahertz imaging.

The sensitivity of a thermal sensor is limited by the ratio of its electrical responsivity and its output referred noise. Output referred noise is the noise measured at the output, which may then be converted to the equivalent noise at the input of the detector (referred to as "input referred noise"). It will be appreciated that the input referred noise is equal output referred noise divided by the responsivity.

Known MOSFET-based detectors suffer from significant 1/f noise caused by the defects of the silicon and oxide interface. Since the sensor's signal corresponding to the measured temperature is obtained at DC or at low frequency compared to the knee frequency, the best resolution that can be achieved is limited by 1/f noise. It will be appreciated that the knee frequency may be defined as the frequency at which the white noise component equals the flicker noise component.

One technical solution addresses the problem by using a MOSFET sensor for performing a linear function, for example signal amplification, such that the sensor's temperature affects the function, for example the amplifier's gain. By determining the gain level, the temperature of the device may be determined.

Some exemplary embodiments utilize the effect that the 1/f noise is a colored noise having different energy levels for different frequencies, and specifically reduced energy level per specific bandwidth at higher frequencies.

In some exemplary embodiments, a periodic probe signal $V_p$ at frequency $f_m$ is fed to the gate of the thermal sensor. $V_p$ is amplified by gain $g_m$ of the common source amplifier, wherein the gain is temperature-dependent. A temperature shift will thus effectively modulate the amplitude of a signal $i_{sig}$ produced by the transistor. A signal at frequency $f_m$ carrying the information on temperature is therefore obtained on a load resistor. The signal can be then demodulated by multiplication with a reference signal having the same frequency and constant amplitude, so that the output signal may be easily read. The output signal is then indicative of the temperature at which the amplifier is operating.

By using such topology, it is possible to shift the frequency of the signal to a part of the spectrum in which the noise amplitude is lower, such that after demodulation, when integrating in the relevant frequencies, which do not include high frequencies, the impact of the noise is significantly reduced, thus increasing the SNR.

One technical effect of utilizing the disclosed subject matter is the usage of a temperature-dependent MOSFET device for performing a linear function and demodulating the output signal in order to separate the signal from the noise. Reading the output provides for estimating the temperature at which the device operates at high resolution. Having such high resolution sensors may be useful in demanding applications such as Terahertz imaging.

Referring now to FIG. 1A, showing a graph of transistor characteristics at different temperatures, demonstrating the concept of measuring the voltage or current of a device for determining the temperature it is working in. The gain of a device such as a transistor depends on its temperature. Thus, each temperature is associated with a curve such as curve 1 (104) associated with 70°, curve 2 (108) associated with 20°, or the other curves, which relate the gate voltage of the transistor and its drain current to the specific temperature.

In order to determine the temperature, the drain current may be read for a known gate voltage. The combination of the gate voltage and the drain current is then searched for on any of the curves (or between two curves). The temperature (or temperature range) associated with the relevant curve(s) may then be determined.

The responsivity of the sensor may be defined as $$R_T = \frac{di_{sig}}{dT_s} = \frac{di_{DS}}{dT_s}$$

Wherein $R_T$ is the responsivity, $di_{sig}$ is the change in the input current, $di_{DS}$ is the delta in the bias current and $dT_s$ is the temperature difference to be measured.

Figure 1B:
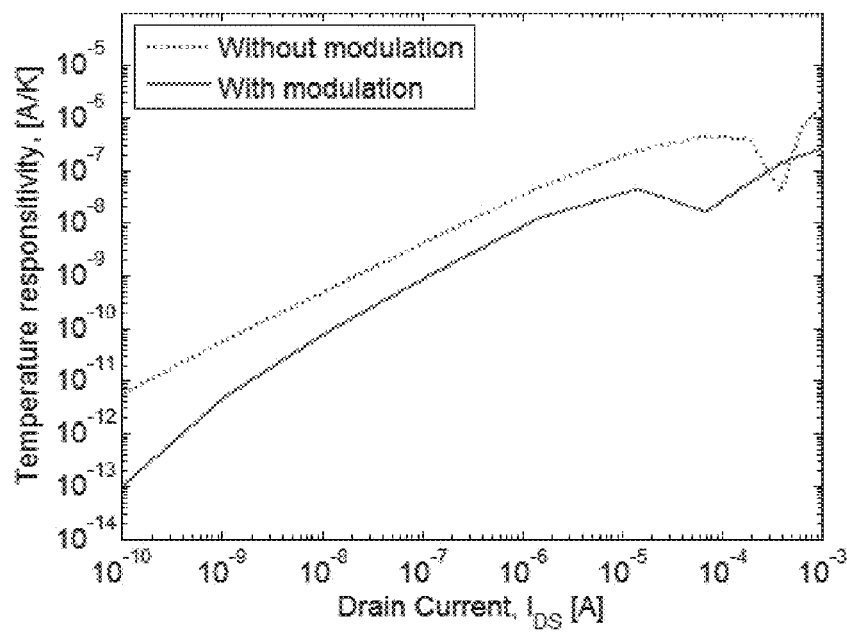
FIG. 1B shows a graph of a sensor responsivity vs. the drain current, with and without modulation and demodulation.

FIG. 1B shows exemplary simulation results of the temperature sensitivity of a sensor vs. the drain current with and without modulation. It can be seen that the temperature responsivity of the small signal used for modulation is lower than the temperature responsivity of the sensor's current.

The output referred noise is dominated by the 1/f component, which may be described by the following behavioral model:

Wherein KF is the flicker noise technology coefficient, $I_{DS}$ the bias current, AF and BF vary from 1 to 2 with the transistor's bias, $C_{ox}$ is the gate oxide capacitance, W and L are the gate dimensions, and $f_1$ and $f_2$ are the integration edges for flicker noise integration.

Figure 1C:
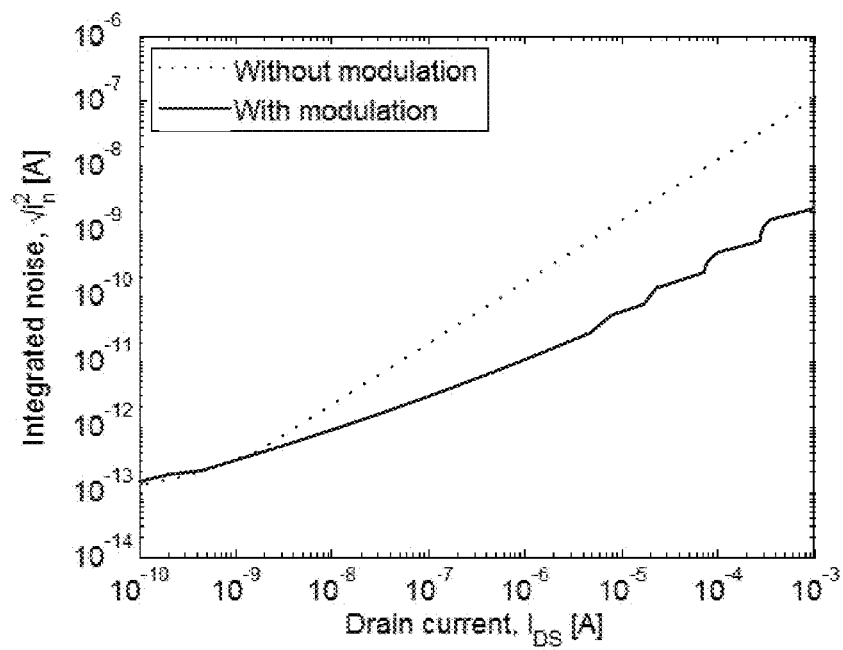
FIG. 1C shows a graph of the integrated sensor noise vs. the drain current, with and without modulation and demodulation.

FIG. 1C shows exemplary simulation results of the integrated noise vs. the drain current with and without modulation. It can be seen that the integrated noise is considerably lower with the modulation.

The sensitivity of a thermal sensor is thus given by the ratio of (1) and (2), resulting in:

$$\Delta T_{min} = \frac{\sqrt{(i_n^2)}}{R_T}$$

In order to improve the sensitivity, the gate's area W·L must be maximized in correspondence to the maximum area available for the sensor. The aspect ratio may be arbitrarily chosen according to the shape that can be integrated best with the sensor. Then, by optimizing the bias current $I_{DS}$ to yield the lowest ΔT, the maximum sensitivity of a MOSFET-based thermal sensor may be obtained in this configuration. Despite the optimization method described above, the sensor's sensitivity may still not be good enough for high requirement applications such as passive THz imaging.

Figure 2:
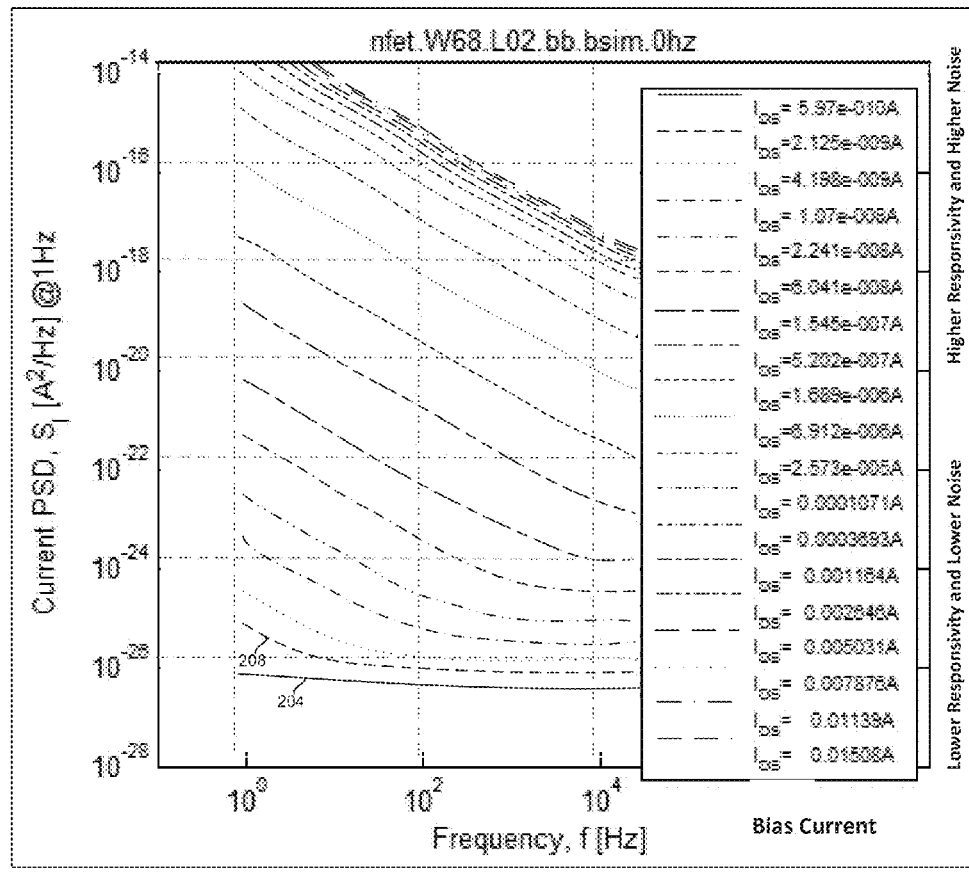
FIG. 2 shows a graph of the noise spectrum of a transistor, referred to its drain terminal.

Referring now to FIG. 2, showing a graph of the noise spectrum of a transistor, referred to its drain current. The graph contains a multiplicity of curves such as curve 1 (204), curve 2 (208) and others, each associated with a different level of the relevant drain current $I_{DS}$. For example, curve 1 (204) relates to bias current of 5.97e-10A, curve 2 (208) relates to bias current of 2.125e-9A or the like. Each such curve shows the correspondence between the noise frequency and the current power spectral density (PSD) of the sensor's noise. It can be seen that the lower bias accounts for lower levels of noise. It can also be seen that due to the slopes of the curves, the 1/f noise source provides for significant contribution to the overall noise.

Therefore, it may be desirable to generate or shift the output signal to a higher frequency, so that it may be separated from the noise using a modulation and demodulation scheme.

Figure 3A:
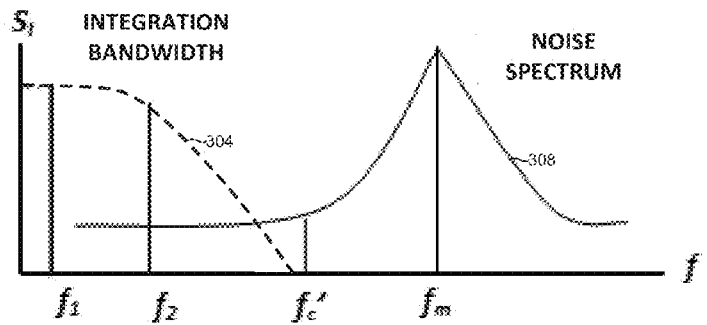
FIG. 3A is a graph of the desired signal and noise frequencies.
Figure 3B:
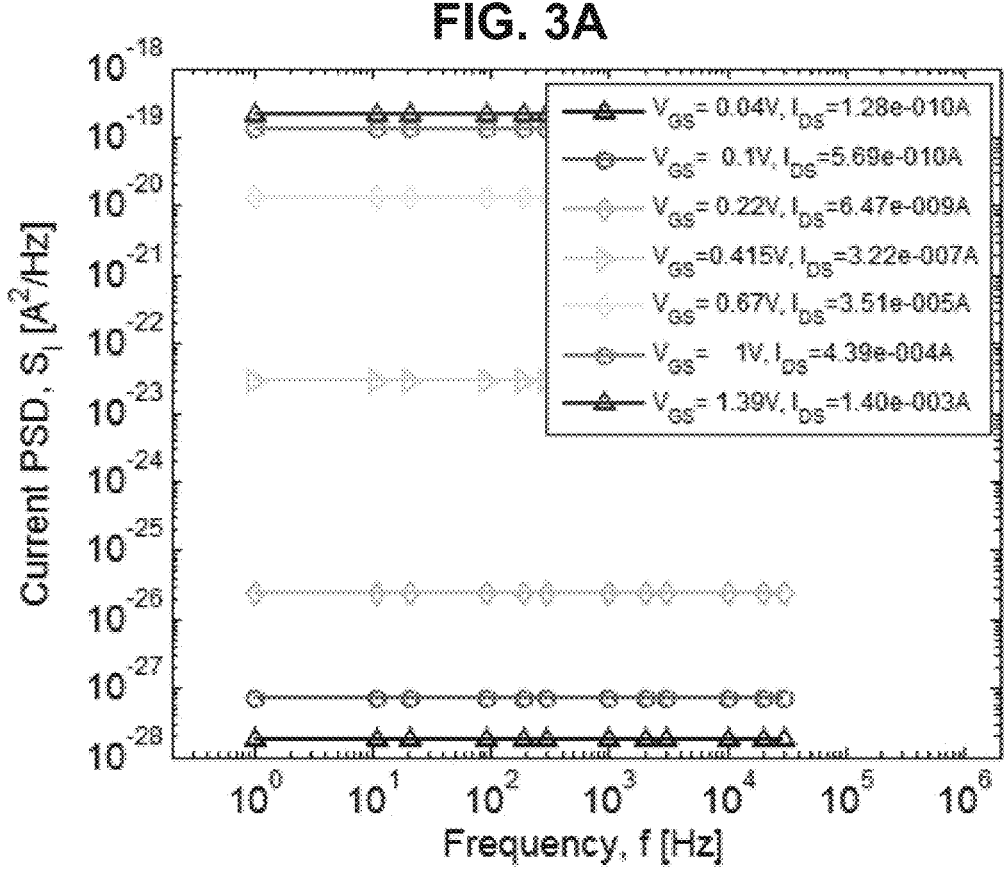
FIG. 3B is a noise spectrum of a transistor after modulation.

Referring now to FIG. 3A and FIG. 3B. FIG. 3A shows a graph of the desired behavior of the signal, wherein curve 304 shows the signal's bandwidth and curve 308 shows the noise spectrum. Most of the signal power is within the integration bandwidth, for example between $f_1$ and $f_2$, while the noise's peak is at a much higher frequency $f_m$, and has little influence within the integration range. Achieving such behavior will provide for eliminating significant portion of the 1/f noise from the signal.

The noise spectrum without the modulation-demodulation scheme is as shown in FIG. 2. After using such scheme, the goal is to obtain a noise spectrum as shown in FIG. 3B wherein the noise amplitude is uniform for all frequencies, and at the low frequencies the amplitude is significantly lower than in the scheme without modulation. Thus, the integral over the noise frequencies is significantly lower and the SNR is higher.

Figure 4A:
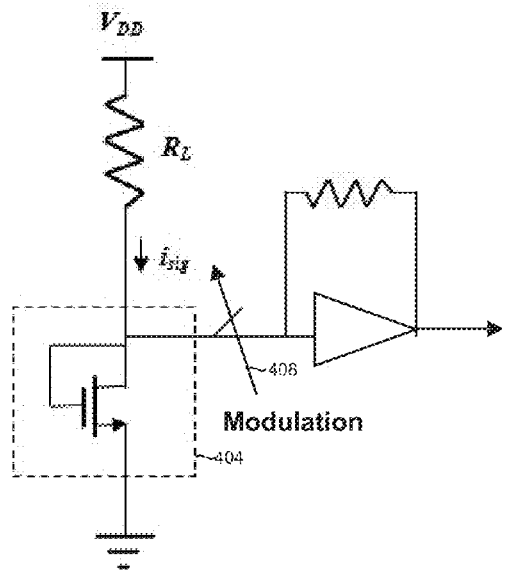
FIG. 4A shows a topology providing low signal to noise ratio.
Figure 4B:
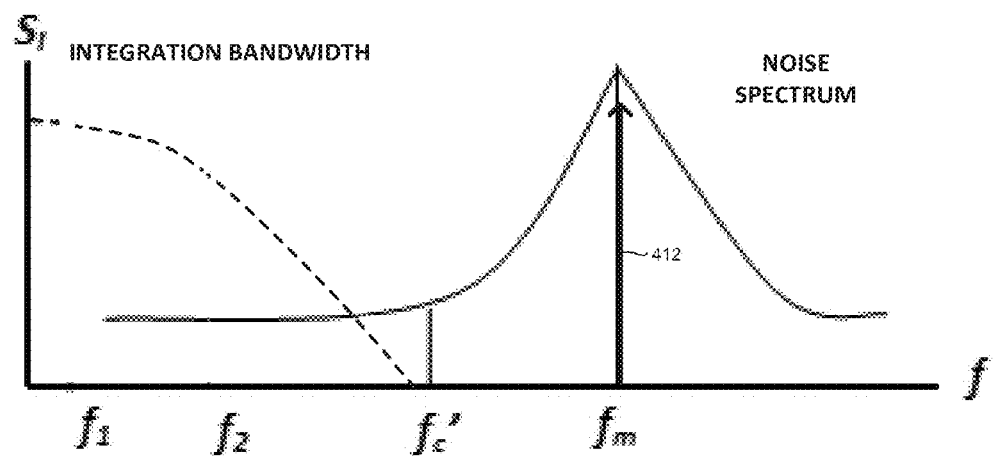
FIG. 4B shows a graph of the noise and signal resulting from the topology of FIG. 4A.

Referring now to FIG. 4A and FIG. 4B. FIG. 4A shows a topology providing low signal to noise ratio when trying to measure the temperature of sensor 404, and FIG. 4B shows a graph of the resulting signal. With this topology, in which the signal output from the transistor, including the noise, is modulated, due to modulation 408 the output signal has a peak 412 at the same frequency as the noise, and of lower amplitude, which provides for low SNR and poor resolution of the signal.

When relying on amplification and averaging only, the signal amplitude is not significant enough relatively to the noise, thus yielding low SNR.

Figure 5A:
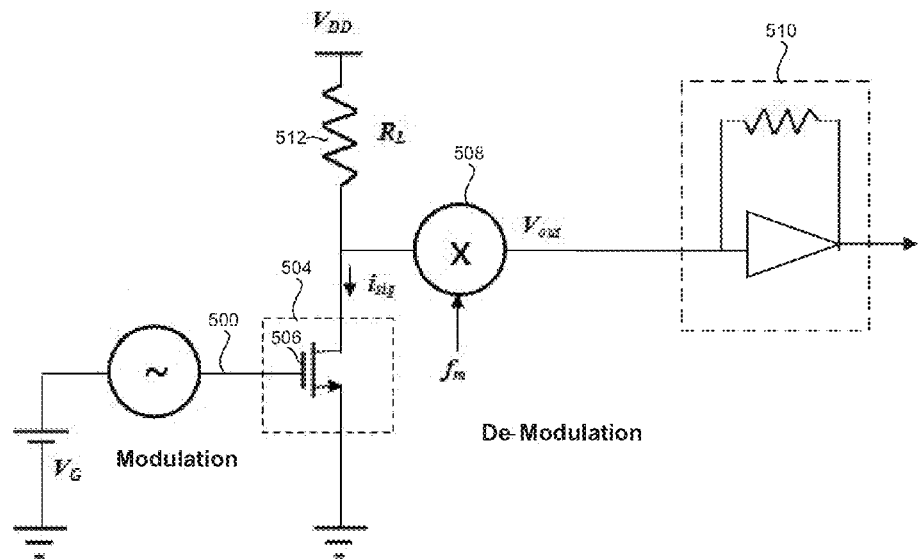
FIG. 5A shows a topology providing high signal to noise ratio, in accordance with some exemplary embodiments of the disclosed subject matter.
Figure 5B:
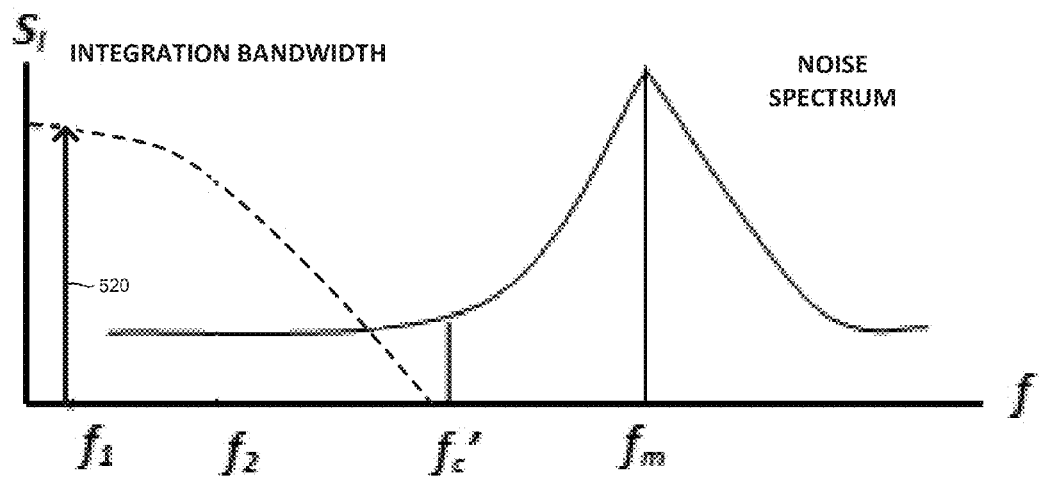
FIG. 5B shows a graph of the resulting noise and signal, resulting from the topology of FIG. 5A, in accordance with some exemplary embodiments of the disclosed subject matter.

Referring now to FIG. 5A and FIG. 5B. FIG. 5A shows an exemplary topology of a circuit that provides for separating the frequencies of the signal from the noise, thus enabling high resolution measurement of the signal and determination of the temperature.

The circuit comprises input signal $V_p$ 500 having frequency $f_m$, which is fed into an amplifier 504 implemented by transistor 506 and resistor 512. The amplification of amplifier 504, as can be determined according to its drain current $I_{sig}$ depends on the temperature it is operating in. The signal as amplified by the amplifier, as well as the noise, are then demodulated using demodulator 508 with a signal of frequency $f_m$ as well, and amplified using amplifier 510. The demodulation shifts the frequency of the amplified signal to the vicinity of zero, while the noise spectrum is shifted to the vicinity of the $f_m$ frequency.

The frequency separation between the signal and the noise provides for measuring the signal with higher accuracy, thus determining the temperature in which the amplifier operates with higher resolution. The signal may then be amplified by amplifier 510 so that it is easier to read and analyze the output.

It will be appreciated that the amplifier, implemented by transistor 506 and resistor 512 may be replaced by any other linear circuit, such that the input signal is affected by the function of the circuit, which enables the frequency separation from the noise that is generated by the circuit itself.

FIG. 5B shows the resulting signal, in which due to the demodulation the amplitude of the signal is indeed concentrated in the vicinity of zero frequency, while the frequency of the noise concentrates in the vicinity of $f_m$. This provides for separating the signal from the noise, reading the signal and assessing the temperature of amplifier 504.

It will be appreciated that in order to reduce the effect of the low-frequency noise of the front-end amplifier, the signal amplification may optionally be performed before demodulation and low-pass filtering.

Referring now to FIG. 6A-6C, showing exemplary implementations of such circuits.

FIG. 6A shows a schematic circuit for small signal modulation based on high pass filter. Temperature sensor 602 comprises N-transistor 604 and P-transistor 608 constituting together the resistance of the filter, and capacitor 612 providing the capacitance for eliminating the low frequencies. The filtered signal is then demodulated by demodulator 616, separating the frequencies of the signal and the noise, which enables the determination of the working temperature of sensor 602.

FIG. 6B shows a schematic circuit for small signal modulation based on common source stage. The circuit comprises transistor 620 and resistor 624 responsible for providing a bias current, and transistor 628 for mirroring the current and providing it to the sensor, the sensor comprising transistor 632. Transistor 632 amplifies input signal 636, and the amplified signal is then demodulated by demodulator 640, separating the frequencies of the signal and the noise, which enables the determination of the working temperature of transistor 632 acting as a sensor.

FIG. 6C shows a schematic circuit for small signal modulation based on a resistive voltage divider. The circuit comprises N-transistor 648, whose gate sizing causes its drain resistance to be equal to that of P-transistor 644 when supply voltage VDD is applied. The drain resistance of temperature sensor 646 comprising N-transistor 648 will vary according to its temperature, and thus also the voltage at the same drain node. The signal is then demodulated by demodulator 652, separating the frequencies of the signal and the noise, which enables the determination of the working temperature of temperature sensor 646.

Figure 7A:
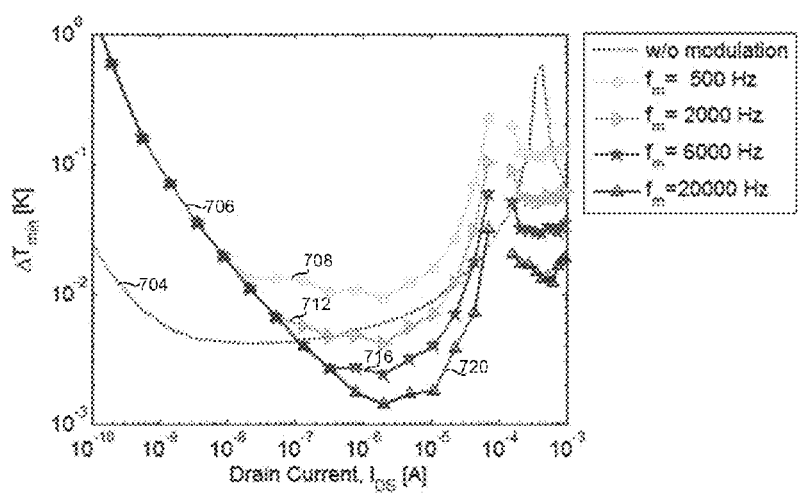
FIGS. 7A-7B show simulation results for the circuit shown in FIG. 6B.

Referring now to FIG. 7A, showing graphs of the temperature resolution achieved for the small signal modulation based on common source stage shown in FIG. 6B above, vs. the drain current of the sensor. The temperature sensitivity is compared for different modulation frequencies $f_m$ and for the case where the MOSFET is operated without modulation as a reference. For $f_m$=2 kHz this configuration yields the same sensitivity as a sensor without modulation. If $f_m$ is further increased up to 20 kHz the temperature sensitivity is improved by a factor of more than three. It will be appreciated that using higher modulation frequencies will not improve the sensitivity further, since the integration bandwidth only includes the white noise component. The current of the common source (CS) stage may be swept from 10 nA to 1 mA in order to determine the best operating point, which is the minimum point of each curve. This sweep may be performed by raising the bias of the CS stage (VG) in steps. The sensor in this example is based on a NFET with gate size of W=13 micron and L=0.32 micron but other gate dimensions may be adopted as well. The assumed integration edges are $f_1$=1 Hz and $f_2$=200 Hz. The probe signal $V_p$ is a square wave and its amplitude is proportional to the bias of the CS stage (VG): Vp=VG·5%, where 0<VG<1.5 V.

Curve 704 shows the resolution without modulation, the minimum of which is about $4*10^{-3}$ degree Kelvin and is achieved for current of $10^{-8}$ Ampere. Curves 706, 708, 712, 716 and 720 show the curves of the resolution vs. the drain current with modulation, for frequencies of 0.5, 2, 6 and 20 KHz, respectively.

It can be seen that higher frequencies account for better resolution. The highest resolution of almost $10^{-3}$ is achieved for frequency of 20 KHz at drain current of about $2*10^{-6}$ Ampere.

Figure 7B:
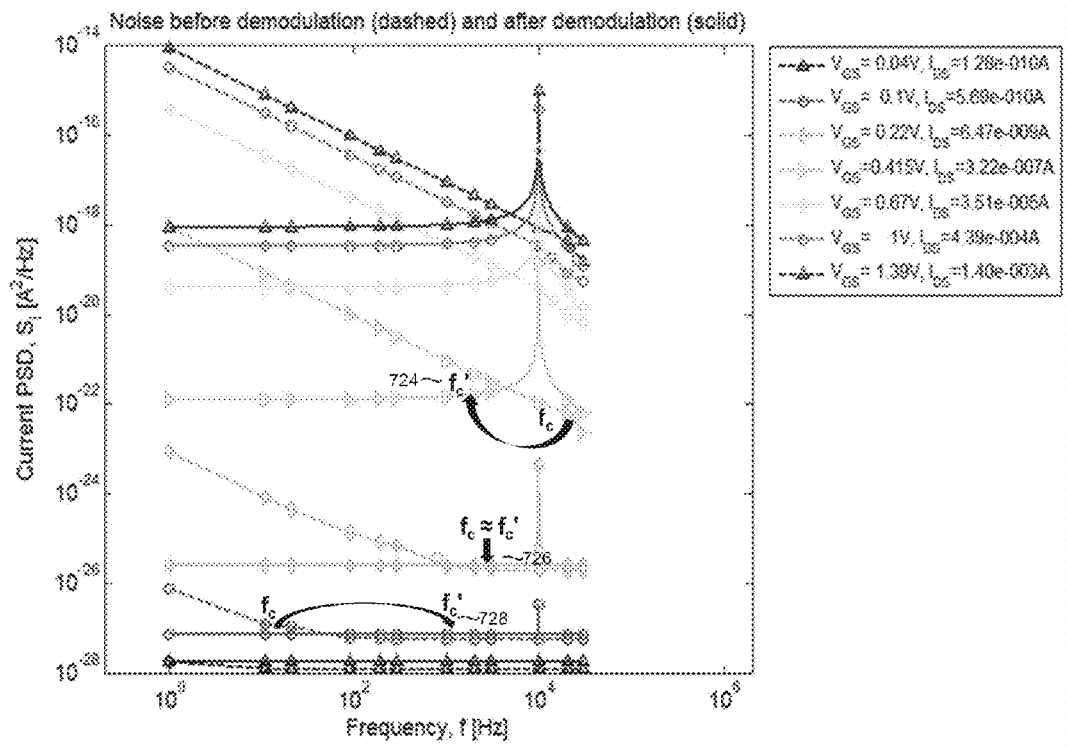

Referring now to FIG. 7B, which includes the graph of FIG. 2, showing in dashed lines the noise spectrum without the modulation-demodulation scheme for various current values. This graph demonstrates that larger current accounts for less uniformly distributed noise, thus stressing the utility of the frequency shift operated by the modulation method.

FIG. 7B also comprises corresponding graphs in solid lines of the noise spectrum after the modulation is applied for the same current values, demonstrating that the noise concentrates around a particular frequency, which is the demodulation frequency, thus enabling separation between the signal and the noise.

Consequently, this noise reduction scheme may be efficient if the modulation frequency is large enough so that the frequency-shifted corner frequency $f_c'$ (indicated as the frequencies at points 724, 726 and 728 or the like) will lie outside the upper frequency edge, i.e., outside the integration bandwidth. As shown in FIG. 5B, this condition can be formulated as $f_m-f_c'>f_2$ wherein $f_2$ is the high end of the integration bandwidth, and $f_m$ is the demodulation frequency. The shift of $f_c$ being the corner frequency without the modulation-demodulation scheme to $f_c'$ being the corner frequency with the modulation-demodulation scheme demonstrates the knee frequency being shifted to outside the bandwidth of the circuit.

As for determining the modulation frequency, low modulation frequencies are not very effective when using this method since in such case fc' will still lie within the f1 ... f2 range and hence the noise spectrum will still include part of the 1/f noise power, resulting in the integrated noise not being minimized, which corresponds to fm<20 kHz in FIG. 7A. However, using high frequencies poses challenges in the AC design. When CMOS thermal sensing is used as part of an electro-optical imaging device, the modulation of the optical signal may be performed instead of modulating the electrical probe signal. However, since thermal sensors are known to have slow response times, of the orders of several milliseconds or more, a relatively low modulation frequency can be applied with a chopper without a signal loss. Moreover, since the optimal modulation frequency in case of CMOS sensors is typically higher than several kilohertz, the frequency shift that can be obtained by optical modulation of the signal is not sufficient for yielding the same improvement that is offered by the electrical modulation method described here.

As discussed above and shown in FIG. 5B above, an improvement or optimum may be achieved if the upconverted knee frequency ($f_c'$) is higher than the integration bandwidth, thus satisfying $f_m-f_c'>f_2$. However, the knee frequency has large fluctuations between chips or even between neighboring devices. Additionally, the knee frequency may grow with the bias current (and the optimum point depends on the noise level, which in turn depends on the knee frequency).

In order to overcome these problems, calibration cycle in closed loop may be performed. The calibration may comprise: 1. determining the minimum required modulation frequency ($f_c'$); 2. Operating the modulation scheme in open loop with the determined frequency; and 3. Repeating calibration after a predetermined time, after a predetermined number of activations, or the like.

The disclosed method and circuit provide for high resolution measurements of temperature and temperature changes, thus enabling new technologies such as implementing THz Focal Plane Arrays (FPA). Obtaining low detector Noise Equivalent Power (NEP) is extremely challenging with room-temperature passive THz sensors. Applying a modulation and demodulation scheme as described above may allow for considerable improvement of the temperature sensitivity.

It will be appreciated that the embodiments presented in the figures above are exemplary only and that many combinations or multiple other circuits may be designed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining a working temperature of a device, comprising:
   providing a first signal to a device having a temperature-sensitive characteristic;
   performing a function on the first signal by the device;
   demodulating a second signal output by the device to obtain a third signal thus generating a signal having reduced 1/f noise component; and
   based upon the first signal and the second signal, determining a working temperature of the device.

2. The method claim 1, wherein the function is a linear function.

3. The method claim 2, wherein the linear function having a known linear dependence.

4. The method claim 2, wherein the linear function is selected from the group consisting of: amplification, high pass filter and low pass filter.

5. The method claim 1, further comprising determining a modulation-demodulation frequency for said device.

6. The method claim 4 comprising repeating said determining after a predetermined period of time or after a predetermined number of activations.

7. A circuit determining a working temperature of a device, comprising:
   a device having temperature-sensitive characteristic, the device performing a function on an input signal and outputting an output signal;
   a signal source for providing the input signal to the device;
   a demodulator for demodulating the output signal, thus generating a signal having reduced 1/f noise component.

8. The circuit of claim 6 comprising component for determining a working temperature of the device based upon the first signal and the second signal.

9. The circuit of claim 6, wherein the function is a linear function.

10. The circuit of claim 7, wherein the linear function is selected from the group consisting of: amplification, high pass filter and low pass filter.

\* \* \* \* \*